United States Patent
Yang

(10) Patent No.: US 8,007,352 B2
(45) Date of Patent: Aug. 30, 2011

(54) OUTSIDE AIR INTRODUCTION GRILL FOR INDUCTING NATURAL CONVECTION IN AIR INFLUX ROOM

(75) Inventor: Keeyoung Yang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 721 days.

(21) Appl. No.: 11/963,330

(22) Filed: Dec. 21, 2007

(65) Prior Publication Data

US 2009/0093208 A1  Apr. 9, 2009

(30) Foreign Application Priority Data

Oct. 9, 2007 (KR) .................. 10-2007-0101429

(51) Int. Cl.
*F24F 7/00* (2006.01)
(52) U.S. Cl. ............... 454/275; 454/276; 454/69
(58) Field of Classification Search .............. 454/275, 454/276, 277, 278, 241, 141, 142, 151, 162, 454/70, 238, 69
See application file for complete search history.

(56) References Cited

U.S. PATENT DOCUMENTS

| | | | | | |
|---|---|---|---|---|---|
| 4,410,032 | A | * | 10/1983 | Mori | 165/44 |
| 4,557,095 | A | * | 12/1985 | Rice et al. | 52/473 |
| 5,762,550 | A | * | 6/1998 | Brunner | 454/184 |
| 7,717,208 | B2 | * | 5/2010 | Knauer | 180/68.6 |
| 2004/0036819 | A1 | * | 2/2004 | Ryu et al. | 349/58 |

FOREIGN PATENT DOCUMENTS

| | | |
|---|---|---|
| JP | 8-268089 A | 10/1996 |
| JP | 2003-276534 | 10/2003 |
| KR | 10-2005-0038460 A | 4/2005 |

* cited by examiner

Primary Examiner — Steven B McAllister
Assistant Examiner — Brittany Towns
(74) Attorney, Agent, or Firm — Morgan, Lewis & Bockius LLP

(57) ABSTRACT

The present invention discloses that outside air flows into an APU room by using a difference in pressure of the inside and the outside of the APU room during driving of a bus to induct a natural convection in the APU room and thus cool an air drier provided in the APU room, and is discharged from the APU room. Accordingly, an increase in temperature of air drier is prevented and the high temperature compressed air generated in compressor is subjected to active heat exchanging in respects to the outside while passing through air drier, thereby preventing formation of moisture according to a change in temperature of the compressed air.

10 Claims, 5 Drawing Sheets

OUTSIDE AIR INTRODUCTION GRILL FOR INDUCTING NATURAL CONVECTION IN AIR INFLUX ROOM

CROSS-REFERENCE TO RELATED APPLICATIONS

The present application is based on, and claims priority from, Korean Application Serial Number 10-2007-0101429, filed on Oct. 9, 2007, the disclosure of which is hereby incorporated by reference herein in its entirety.

FIELD OF THE INVENTION

The present invention relates to an outside air introduction grill, and more particularly, to an outside air introduction grill for inducting a natural convection of outside air flowing into a sealed room.

BACKGROUND OF THE INVENTION

Generally, a vehicle is provided with a cooling device for drawing cold air from the outside to the inside to cool heat of an internal device, for example, a radiator grill which is provided at a front side of an engine room to introduce cold air from the outside to the engine room.

In particular, in the case of large vehicles such as buses, an air pressure driving device is frequently used. In the air pressure driving device, an engine room is provided at a rear side thereof, high pressure compressed air is generated by using a compressor during driving of the engine and stored in an air tank which is provided in a separate room, and the stored compressed air is used during the braking or when the braking is required.

In the air pressure driving device, a cooling fan is provided in a room including the air tank (generally, an APU room) or the outside air is allowed to flow in the room so that the compressed air which is compressed and stored at high pressure and temperature suppresses the generation of moisture necessarily caused according to an environmental temperature, thereby reducing an absolute humidity of the compressed air.

In respects to the above-mentioned pneumatic device, the pressure is increased due to the compressor which is provided at a side of an engine and compresses air, and the temperature of the compressed air is increased to about 90° while the compressed air flows between compressor A and the air tank. Thus, generally, an air drier is provided in the pneumatic device, so that air comes into contact with a substance such as a desiccant to remove gas-phase moisture from air and discharge the moisture to the outside of the vehicle while the gas-phase moisture is converted into liquid-phase moisture.

However, the air drier may provide a fatal cause of a brake device trouble because the air drier obstructs the movement of air or blocks a pneumatic tube during the braking due to the moisture when the moisture is generated according to a change in phase of the compressed air due to a change in temperature of the air tank.

Therefore, the air drier has a structure in which an internal tube is formed to have a spiral shape so as to ensure a sufficient length and air flowing from the compressor moves while heat exchanging occurs between the air flowing from compressor A and the outside air to reduce the temperature.

In addition, with respect to the air drier, it is required that the cooling is performed so that the temperature of the room including the air drier is not increased to a predetermined value or more in order to maintain desirable moisture removing performance in the compressed air.

Accordingly, in the case of the bus, in order to maintain the desirable temperature of the room where the air drier is provided, the outside air flows into the APU room which is structured in such a way that the room is cooled in conjunction with the air drier by using a cooling fan operated by the motor or an air tank and a tube line are provided in conjunction with the air drier at a rear side of the bus to cool the APU room.

However, in the case of when the outside air flows in the APU room in the bus, the cooling performance depends on the outside air introduction performance of the grill provided in the APU room, and the outside air introduction grill is typically provided at a side of the APU room. Accordingly, the case is disadvantageous in that the outside air does not sufficiently flow in the APU room during the driving of the bus.

Furthermore, since the grill which is provided in the APU room so as to introduce the outside air into the APU room is formed to have a simple structure including channels transversely disposed at predetermined intervals, it is difficult to allow the outside air to desirably flow through the grill into the APU room.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

An embodiment of the present invention helps overcome the drawbacks of the outside air introduction grill and forms a flow of outside air which is desirably introduced in a sealed room and discharged from the sealed room by introducing the outside air so that a grill provided at a side of the room inducts a natural convection in the room, and simultaneously forming outside air influxes and outside air outfluxes that are spaced apart from the outside air influxes so that the outside air inducting the natural convection in the room is discharged to the outside.

Another embodiment of the present invention helps maintain desirable cooling performance in respects to an air tank and an air drier constituting a pneumatic device provided in an APU room without using power such as a cooling fan by providing a grill which is used to simultaneously form outside air influxes and outside air outfluxes that are spaced apart from the outside air influxes in the APU room so that the outside air is rapidly introduced into the APU room and discharged from the APU room where there is a difference in pressure between the inside and the outside during the driving and a natural convection is formed in the room.

Still another embodiment of the present invention helps prevent a weight and a cost from being increased and improve an appearance by performing desirable cooling in respects to the inside of an APU room using a grill which is used to simultaneously form outside air influxes and outside air outfluxes that are spaced apart from the outside air influxes in the APU room so that a cooling fan and a power means are not used to introduce the outside air into the APU room.

An outside air introduction grill for inducting a natural convection in an air influx room according to an embodiment of the present invention includes a plurality of outside air influxes which are formed in a side of the sealed room to induct the outside air into the room and include a plurality of slots. A plurality of outside air outfluxes induct the outside air from the room to the outside. Therefore, the outside air flowing into the room forms the natural convection, circulates, and is discharged and include a plurality of slots. The outside air influxes and the outside air outfluxes are spaced apart from each other.

The outside air introduction grill includes a plate body which constitutes a side of the sealed room. The outside air influxes are formed in a partial area of the plate body to allow the outside air to flow from the outside to the room. The outside air outfluxes are formed in an area of the plate body where the outside air influxes are not formed at predetermined intervals and spaced apart from the outside air influxes. Therefore, the outside air flows from the inside to the outside.

The outside air influxes and the outside air outfluxes are formed of a plurality of outside air elements which include slots transversely formed in the sealed room and protruding portions between the slots partially covering the slots. The outside air influxes are disposed at a rear side of a flow direction of the outside air and the outside air outfluxes are disposed at a front side of the flow direction of the outside air.

The outside air introduction grill further includes additional outside air paths which are formed of a plurality of slots at predetermined intervals between the outside air influxes and the outside air outfluxes.

The outside air introduction grill is provided between a compressor and an air tank which receives compressed air generated in the compressor operated in conjunction with an engine through a pipe line, stores the compressed air, and supplies the compressed air to a compressed air using device to constitute a bottom side of an APU room including an air drier which reduces a temperature by a flow of the compressed air and collects and discharges moisture, so that the outside air is introduced through the outside air influxes into the APU room to induct the natural convection, and then discharged through the outside air outfluxes to the outside.

In the exemplary embodiment of present invention, outside air influxes and outside air outfluxes that are spaced apart from the outside air influxes are simultaneously formed so that a grill which is provided at a side of a sealed room is allowed the outside air influx to induct a natural convection in the room. Accordingly, the outside air is desirably introduced and discharged due to the driving wind air without using a forcing outside air influx device such as a cooling fan.

Furthermore, the grill in which the outside air influxes and the outside air outfluxes that are spaced apart from the outside air influxes are simultaneously provided in the APU room of the bus, which includes an air tank and an air drier constituting a pneumatic device. Accordingly, while the outside air is rapidly introduced into the APU room and discharged from the APU room where there is a difference in pressure between the inside and the outside during the driving, desirable cooling performance is maintained by the natural convection formed in the APU room. Thus, since a cooling fan and a power means are not used to introduce the outside air into the APU room, an increase in weight and cost is prevented and an appearance is improved.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
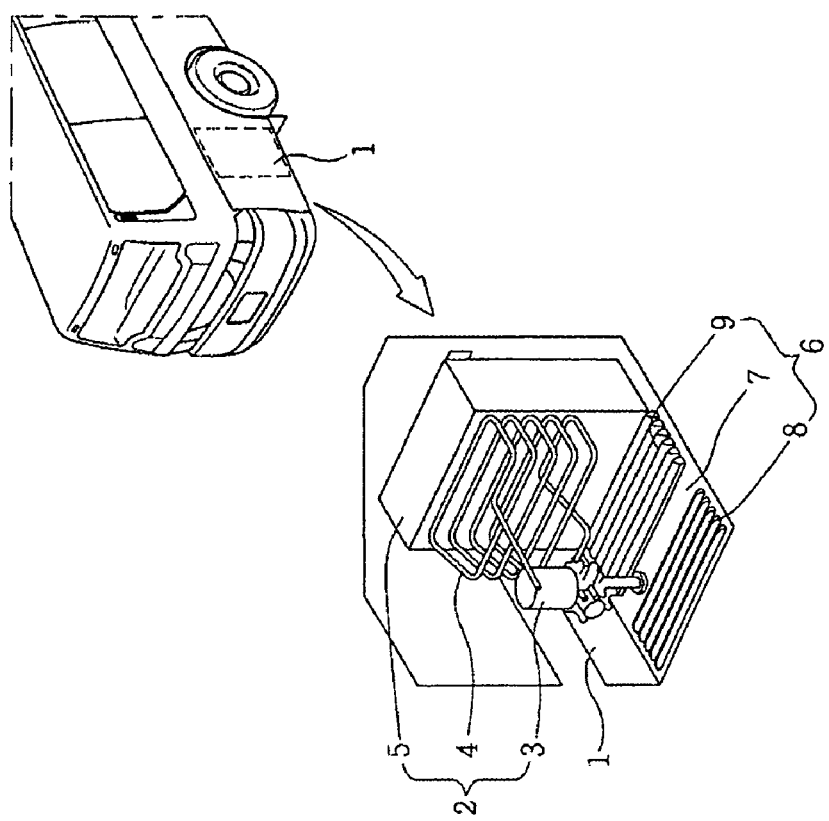
FIG. 1 is a view illustrating an outside air introduction grill for inducting a natural convection in an air influx room according to an embodiment of the present invention, which is provided in an APU room of a bus.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

FIG. 1 is a view illustrating a configuration of an APU room of a driving wind air natural convection cooling type bus according to an embodiment of the present invention. According to the exemplary embodiment of the present invention, an APU room 1 is disposed at a side of a rear part of a bus which is provided with an engine, and a compressed air storage assembly 2 which receives compressed air from a compressor A operated in conjunction with an engine, stores the compressed air, and supplies the compressed air to a compressed air using device B is provided in APU room 1. An outside air introduction grill 6 is provided at a bottom side of APU room 1 to generate a convection in which the outside air flows into APU room 1 due to a difference in pressure caused by the driving wind air and is then discharged to the outside.

In connection with this, compressed air storage assembly 2 is provided with an air tank 5 which receives the compressed air from compressor A and then stores the compressed air, and an air drier 3 which is connected to air tank 5 through a pipe line 4 so as to prevent the temperature of the compressed air which is generated from compressor A from being increased and to discharge moisture to the outside when the moisture is generated.

In this connection, outside air introduction grill 6 may be provided in a sealed room for outside air influx so that the outside air flows into the room, circulates in the room, and is discharged to the outside. Since the room is provided at various positions regardless of the type of vehicle, the room in which outside air introduction grill 6 is provided is not limited.

However, in the exemplary embodiment of the present invention, in the case of when an engine is provided at a rear part like a bus and an APU room including an air tank and an air drier constituting a pneumatic device is provided at a side thereof, it is required that performance of the air drier, which removes moisture from the compressed air, is maintained in an optimal state in order to prevent the temperature of the air drier from being increased. For this reason, outside air introduction grill 6 according to the exemplary embodiment of the present invention may be considered the optimum embodiment. Accordingly, a description will be described of APU room 1 including outside air introduction grill 6 provided therein.

Outside air introduction grill 6 is provided with a plate body 7 which constitutes a bottom side of APU room 1, outside air influxes 8 which constitutes a part of plate body 7 to allow the outside air to flow from the outside to the inside therethrough, and outside air outfluxes 9 which are spaced apart from the outside air influxes 8 to allow the air to flow from APU room 1 to the outside therethrough, so that the outside air forms a natural convection in APU room 1.

As shown in FIG. 2A, the outside air influxes 8 include a plurality of outside air influx elements $8a, \ldots, 8n$ which are protruded from them plate body 7 in APU room 1 and transversely disposed in APU room 1.

As shown in FIG. 2B, the outside air influx elements $8a, \ldots, 8n$ are protruded so that the outside air does not flow into the elements to the outside in respects to a driving direction of the bus, and partially covers the openings so that the outside air influx flows via the outside air influx elements into APU room 1.

In addition, protruding outside air influx elements $8a, \ldots, 8n$ each have a circular arc shape to partially cover the openings, so that the outside air influx flows from the openings via the circular arc into APU room 1.

Furthermore, as shown in FIGS. 2A and 2B, outside air outflux elements $9a, \ldots, 9n$ which are formed in the outside air outfluxes 9 are protruded in APU room 1, and transversely disposed in APU room 1.

The outside air outflux elements $9a, \ldots, 9n$ are protruded so that the outside air flows through the elements to the outside in respects to a driving direction of the bus, and partially covers the openings so that the outside air influx flows via the outside air outflux elements from APU room 1 to the outside.

In addition, protruding outside air outflux elements $9a, \ldots, 9n$ each have a circular arc shape to partially cover the openings, so that the outside air influx flows from APU room 1 through the circular arc to the outside.

Moreover, the outside air influx elements and the outside air outflux elements may have various types of shapes. For example, as shown in FIG. 2C, outside air influx and outflux elements $8a', \ldots, 8n'$, and $9a', \ldots, 9b'$ may have a rectangular shape to partially cover the openings, or outside air influx and outflux elements $8a'', \ldots, 8n''$, and $9a'', \ldots, 9b''$ may have a trapezoidal shape to partially cover the openings.

Meanwhile, the outside air introduction grill 6 may further include an additional outside air path 10 positioned between the outside air influxes 8 and the outside air outfluxes 9. The additional outside air paths 10 function to allow the outside air to flow into APU room 1 therethrough or to allow the outside air to flow from APU room 1 to the outside.

Figure 3:
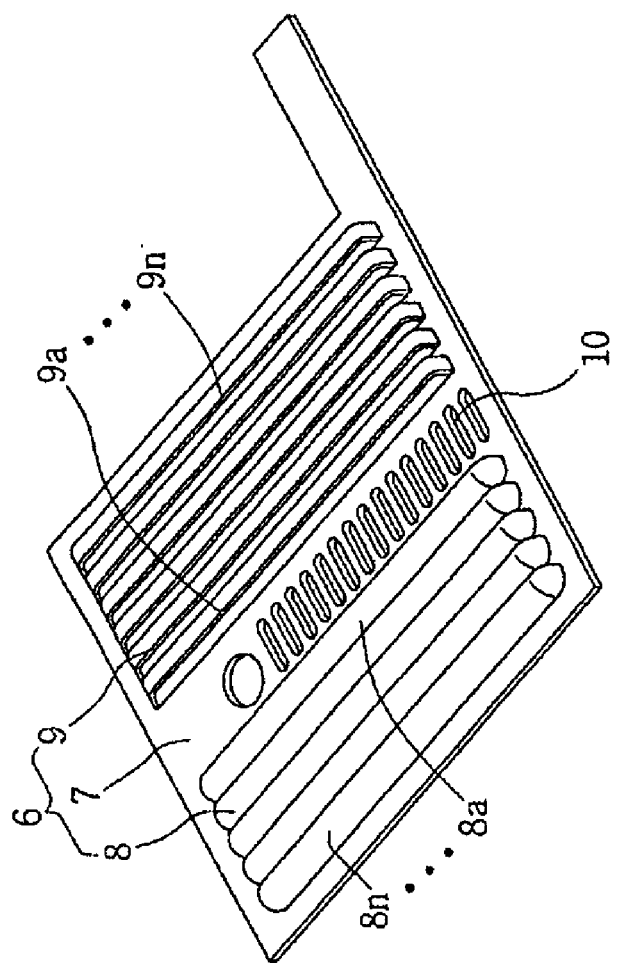
FIG. 3 is a modified view of FIGS. 2A to 2C.

In order to perform this, as shown in FIG. 3, additional outside air paths 10 are formed of a plurality of slots which are disposed in plate body 7 between the outside air influxes 8 and the outside air outfluxes 9 at predetermined intervals.

Additional outside air paths 10 may have various shapes. Preferably, additional outside air paths 10 may be longitudinally formed in respects to plate body 7.

Figure 4:
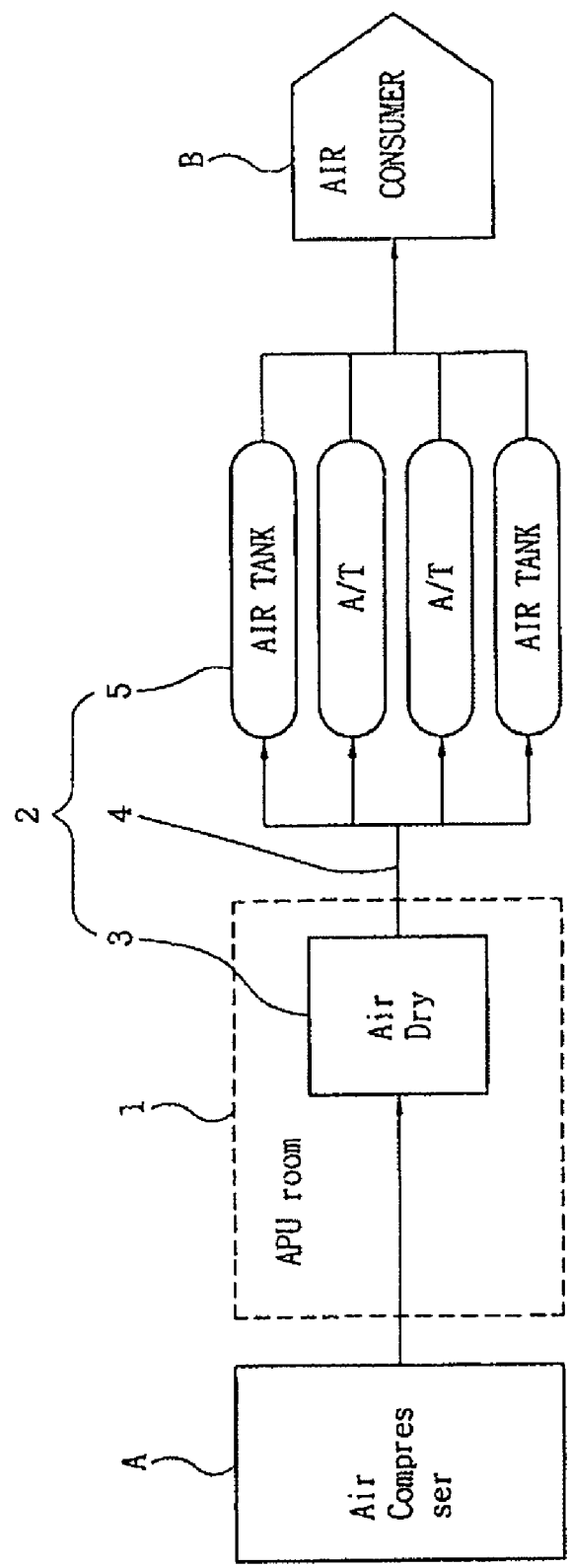
FIG. 4 is a circuit view schematically illustrating a pneumatic device of the bus according to the exemplary embodiment of the present invention.

Meanwhile, FIG. 4 is a view schematically illustrating a compressed air path of a pneumatic system which is applied to a bus. As shown in the drawing, APU room 1 is provided between a compressor A and a compressed air using device B in order to prevent the temperature of air drier 3 through which the high temperature compressed air passes from being increased. Accordingly, air drier 3 is set to be maintained at the optimal temperature so as to desirably maintain a natural convection in APU room 1 so that heat exchanging desirably occurs in respects to the outside.

Hereinafter, the operation of an exemplary embodiment of the present invention will be described in detail with reference to the accompanying drawings.

The exemplary embodiment of the present invention discloses that outside air flows into APU room 1 by using a difference in pressure of the inside and the outside of the APU room 1 during driving of a bus to induct a natural convection in the APU room 1 and thus cool air drier 3 provided in the APU room 1, and is discharged from the APU room 1. Accordingly, an increase in temperature of air drier 3 is prevented and the high temperature compressed air generated in compressor A is subjected to active heat exchanging in respects to the outside while passing through air drier 3, thereby preventing formation of moisture according to a change in temperature of the compressed air.

In respects to the operation, as shown in FIG. 1, outside air grill 6 is provided at a bottom side of APU room 1 which includes air drier 3 connected to compressor A and also connected through pipe lines 4 to air tank 5. Accordingly, the outside air of the driving wind air which flows along the bottom side of APU room 1 during the driving is introduced through the outside air introduction grill 6 into APU room 1 and discharged from APU room 1 through the outside air introduction grill 6 due to low pressure in APU room 1 to form a natural convection, thus preventing the temperature of the inside of APU room 1 from being increased and also preventing a reduction in performance due to an increase in temperature of air drier 3.

Figure 2:
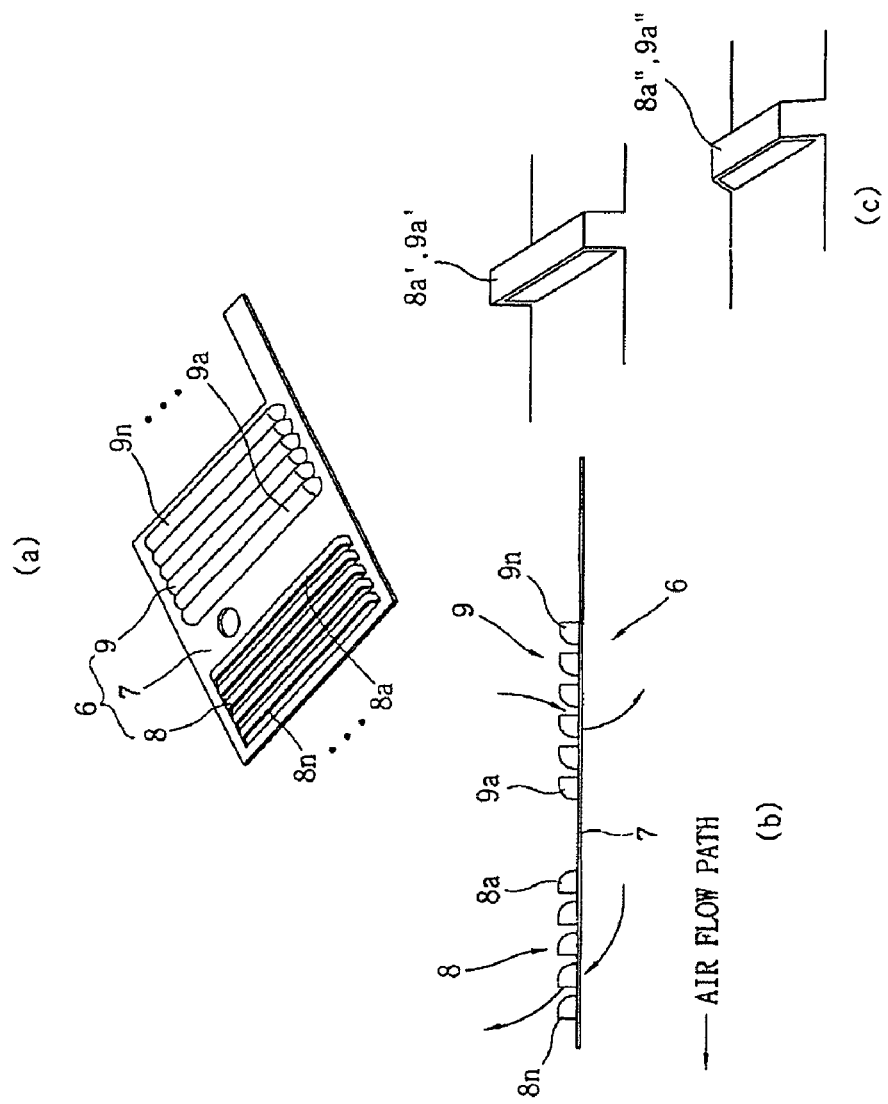
FIGS. 2A to 2C are views illustrating configurations of the outside air introduction grill for inducting the natural convection in the air influx room according to the exemplary embodiment of the present invention.

As shown in FIG. 2, the outside air introduction grill 6 which allows the outside air to flow into APU room 1, circulate in the room, and be discharged from the room therethrough are disposed between the outside air influxes 8 and the outside air outfluxes 9 so that the outside air introduction grill 6 is disposed at a rear area of the vehicle (on the basis of a forward direction of the vehicle) in respects to outside air influxes 8 which are formed to allow the driving wind air to be introduced therethrough.

In connection with this, the outside air influxes 8 include a plurality of outside air influx elements $8a, \ldots, 8n$ which are transversely disposed in APU room 1 so that the outside air uniformly flows into entire APU room 1. In addition, the circular arc which constitutes the covering part of the slot faces the front end of the vehicle. For this reason, the outside air which is introduced through the openings flows along the circular arc from the inside of APU room 1 upward.

Furthermore, outside air outfluxes 9 each have the same shape as outside air influxes 8, and outside air outflux elements 9a, ..., 9n are disposed with their backs to outside air influx elements 8a, ..., 8n. That is, outside air outflux elements 9a, ..., 9n are provided so that the circular arc constituting the covering part which is adjacent to the slots faces the rear end of the vehicle. For this reason, the air which flows from the inside of APU room 1 downward is discharged along the circular arc to the slots.

Figure 5:
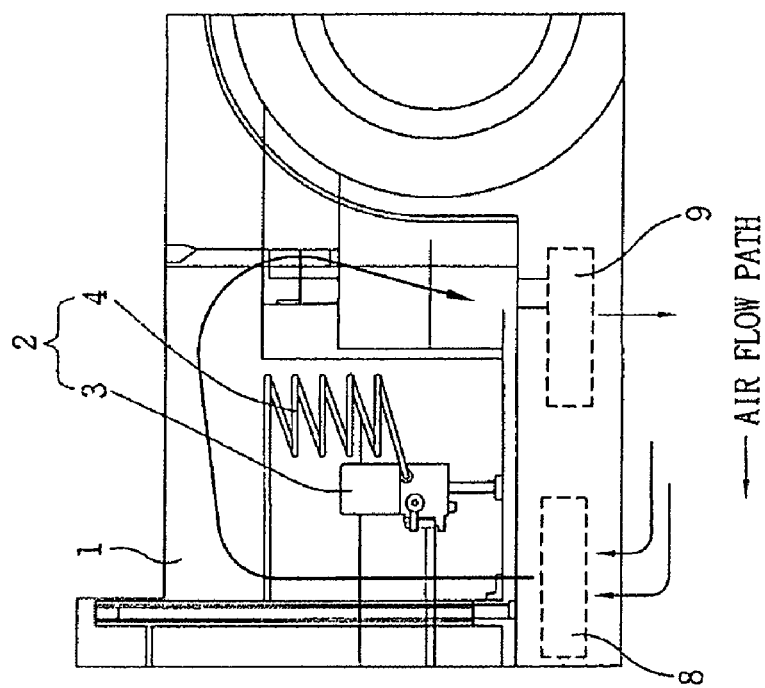
FIG. 5 is a view illustrating the circulation of the outside air which flows into the APU room by using the outside air introduction grill, forms a natural convection, and is discharged to the outside during driving of the bus according to the exemplary embodiment of the present invention.

Therefore, since the outside air introduction grill 6 which includes the outside air influxes 8 and the outside air outfluxes 9 is provided at the bottom side of APU room 1, as shown in FIG. 5, when the driving wind air which flows under the vehicle during the driving of the vehicle passes through outside air introduction grill 6, the air flows through the slots which are formed between outside air influx elements 8a, ..., 8n of outside air influxes 8 into APU room 1.

In connection with this, the outside air which is introduced through the slots between outside air influx elements 8a, ..., 8n is apt to flow upward along the circular arc disposed at the air influx path. The upward flowing of the outside air promotes convection in APU room 1.

Subsequently, the convection which occurs in APU room 1 enables the air to be uniformly dispersed in APU room 1. For this reason, the low temperature fresh air cools the pipe line 4, air tank 5, and air drier 3 which are provided in APU room 1. In particular, the low temperature air cools the air drier 3 which functions to collect moisture according to a change in temperature of the high temperature compressed air so that the air drier 3 has the optimal performance.

Therefore, the air which is introduced into APU room 1 descends downward in APU room 1 due to the convection and flows toward the outside air introduction grill 6. Next, the air is discharged through outside air outflux elements 9a, ..., 9n which are formed in outside air outfluxes 9 of outside air grill 6 to the outside.

In connection with this, the protruding parts each having the circular arc shape of the slots between outside air outflux elements 9a, ..., 9n help the discharging of air. That is, the descending air flows along the circular arcs of outside air outflux elements 9a, ..., 9n toward the slots.

Therefore, the outside air introduction grill 6 which is provided in the bottom side of the inside of APU room 1 causes a pressure difference in APU room 1 due to the driving wind air. In addition, since the outside air is transversely introduced into APU room 1, continuous convection of air occurs in APU room 1 during the driving. Accordingly, an increase in temperature of air drier 3 which is an internal device is prevented so as to ensure optimal heat transferring performance of the high temperature compressed air which flows therethrough.

Meanwhile, the same operation is performed in respects to various types of modifications of the outside air introduction grill 6 through which the fresh outside air flows into APU room 1. For example, as shown in FIG. 3, in the case of additional outside air paths 10 which are formed between outside air influxes 8 and outside air outfluxes 9, additional outside air paths 10 allow the outside air to flow through outside air path 10 into APU room 1, thus helping the operation of outside air influxes 8 or the operation of outside air outfluxes 9 to allow the air to flow from APU room 1 to the outside.

In respects to the introduction of the outside air through additional outside air paths 10, a difference in pressure is generated in APU room 1 due to the driving wind air during the driving. For this reason, while the driving wind air flows through additional outside air paths 10, the outside air is introduced through a plurality of slots which are disposed at predetermined intervals into APU room 1.

Furthermore, the discharging of the outside air through additional outside air paths 10 is performed because the discharging of the air flowing downward is strongly performed in APU room 1 in comparison with the introduction of the driving wind air in the case of when a difference in pressure is small in APU room 1.

As apparent from the forgoing, there is an advantage in that the drawbacks of the hydraulic brake system are overcome by an electric motor, and a sufficient braking force required for the brake system is provided by generating the self boosting function using the motor and rotational inertia of the brake disc, contributing to a stable braking action.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. An outside air introduction grill unit for inducting a natural convection in an air influx room of a vehicle, comprising:
   at least an outside air inlet formed in an inner side of the air influx room and including at least a slot and a protruding portion to partially cover the at least a slot to directly induct air into the air influx room; and
   at least an outside air outlet formed in the inner side of the air influx room and including a plurality of slots and a protruding portion to partially cover the plurality of slots to directly induct air in the air influx room to the outside so that the air flowing into the air influx room circulates in the air influx room and is discharged by natural convection;
   wherein the outside air inlets and the outside air outlets are spaced apart from each other;
   wherein the protruding portion of the at least an outside air inlet and the protruding portion of the at least an outside air outlet are aligned in opposite direction therebetween; and
   wherein an outside air introduction grill is provided between a compressor and an air tank which receives compressed air generated in the compressor operated in conjunction with an engine through a pipe line, stores the compressed air, and supplies the compressed air to a compressed air using device to constitute a bottom side of an APU room including an air drier which reduces a temperature by a flow of the compressed air and collects and discharges moisture, so that the air is introduced through the outside air inlets into the APU room to induct the natural convection, and then discharged through the outside air outlets to the outside.

2. The outside air introduction grill unit for inducting a natural convection in an air influx room as defined in claim 1, wherein the outside air introduction grill comprises:

a plate body which constitutes a side of the sealed room;

the outside air inlets which are formed in a partial area of the plate body to allow the outside air to flow from the outside to the air influx room; and the outside air outlets which are formed in an area of the plate body where the outside air inlets are not formed at predetermined intervals and spaced apart from the outside air inlets so that the outside air flows from the inside to the outside.

3. The outside air introduction grill unit for inducting a natural convection in an air influx room as defined in claim 2, wherein the outside air inlets are disposed at a rear side of a flow direction of the outside air and the outside air outlets are disposed at a front side of the flow direction of the outside air.

4. The outside air introduction grill unit for inducting a natural convection in an air influx room as defined in claim 2, wherein the outside air inlets and the outside air outlets are formed of at least an outside air element which include the at least a slot transversely formed in the sealed room.

5. The outside air introduction grill unit for inducting a natural convection in an air influx room as defined in claim 4, wherein the protruding portions which partially covering the slots of the outside air influx elements each have a circular arc shape and cover the slots so that the outside air does not flow through the slots to the outside in respects to a flow direction of the outside air.

6. The outside air introduction grill unit for inducting a natural convection in an air influx room as defined in claim 4, wherein the protruding portions which partially covering the slots of the outside air outflux elements each have a circular arc shape and cover the slots so that the outside air flows through the slots to the outside in respects to a flow direction of the outside air.

7. The outside air introduction grill unit for inducting a natural convection in an air influx room as defined in claim 4, wherein the protruding portions of the outside air influx and outflux elements which cover the slots each have a rectangular shape.

8. The outside air introduction grill unit for inducting a natural convection in an air influx room as defined in claim 4, wherein the outside air inlet and outflux elements each have both inclined ends which are protruded to cover the slots.

9. The outside air introduction grill unit for inducting a natural convection in an air influx room as defined in claim 2, further comprising:

additional outside air paths which are formed in the plate body between the outside air inlets and the outside air outlets.

10. The outside air introduction grill unit for inducting a natural convection in an air influx room as defined in claim 9, wherein the additional outside air paths are formed of at least a slot which are spaced apart from each other.

\* \* \* \* \*